United States Patent
Larsson et al.

(10) Patent No.: US 9,801,185 B2
(45) Date of Patent: Oct. 24, 2017

(54) 256 QUADRATURE AMPLITUDE MODULATION USER EQUIPMENT CATEGORY HANDLING

(71) Applicant: TELEFONAKTIEBOLAGET L M ERICSSON (PUBL), Stockholm (SE)

(72) Inventors: Daniel Larsson, Stockholm (SE); Jung-Fu Cheng, Fremont, CA (US); Yu Yang, Solna (SE); Meng Wang, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/030,496

(22) PCT Filed: Jan. 27, 2015

(86) PCT No.: PCT/IB2015/050629
§ 371 (c)(1),
(2) Date: Apr. 19, 2016

(87) PCT Pub. No.: WO2015/114525
PCT Pub. Date: Aug. 6, 2015

(65) Prior Publication Data
US 2016/0270055 A1 Sep. 15, 2016

Related U.S. Application Data

(60) Provisional application No. 61/933,410, filed on Jan. 30, 2014.

(51) Int. Cl.
*H04W 72/04* (2009.01)
*H04L 1/00* (2006.01)
(Continued)

(52) U.S. Cl.
CPC ......... *H04W 72/048* (2013.01); *H04L 1/0003* (2013.01); *H04L 1/0009* (2013.01);
(Continued)

(58) Field of Classification Search
CPC ..... H04L 1/1812; H04L 1/1822; H04L 5/001; H04L 5/0055; H04W 72/042
See application file for complete search history.

(56) References Cited

U.S. PATENT DOCUMENTS

| | | | |
|---|---|---|---|
| 2011/0035639 A1* | 2/2011 | Earnshaw | H04L 1/1812 714/748 |
| 2013/0083753 A1* | 4/2013 | Lee | H04W 72/0453 370/329 |

(Continued)

FOREIGN PATENT DOCUMENTS

WO 2013/187824 A1 12/2013

OTHER PUBLICATIONS

Texas Instruments: "Standard and other impacts of introducing 256 QAM," 3GPP draft; R1-135249, 3rd Generation Partnership Project; vol. RAN WG1, San Francisco, CA, USA; Nov. 13, 2013.
(Continued)

*Primary Examiner* — Jung Park

(57) ABSTRACT

According to some embodiments, a method of performing a Hybrid Automatic Repeat Request (HARQ) process comprises receiving, by a wireless device executing a HARQ process, a first transport block encoded according to a category type of the wireless device and a first modulation coding scheme; decoding, by the HARQ process, the first transport block using a number of soft bits N; receiving, by the wireless network element, a second transport block encoded according to the equipment type and a second modulation coding scheme different from the first modula-
(Continued)

tion coding scheme; and decoding, by the HARQ process, the second transport block using the number of soft bits N.

20 Claims, 10 Drawing Sheets

(51) Int. Cl.
H04L 1/18 (2006.01)
H04L 27/00 (2006.01)
H04L 5/00 (2006.01)
H04L 27/36 (2006.01)
H04L 5/14 (2006.01)

(52) U.S. Cl.
CPC .......... *H04L 1/0045* (2013.01); *H04L 1/1819* (2013.01); *H04L 1/1887* (2013.01); *H04L 5/006* (2013.01); *H04L 5/0057* (2013.01); *H04L 27/0008* (2013.01); *H04L 27/362* (2013.01); *H04L 5/1453* (2013.01); *H04L 27/0012* (2013.01)

(56) References Cited

U.S. PATENT DOCUMENTS

| 2013/0165183 | A1* | 6/2013 | Gerstenberger | H04L 1/1835 455/561 |
| 2013/0176981 | A1* | 7/2013 | Earnshaw | H04L 1/02 370/329 |
| 2014/0153484 | A1* | 6/2014 | Kim | H04L 1/004 370/328 |
| 2014/0313985 | A1* | 10/2014 | Nimbalker | H04L 27/0012 370/329 |
| 2015/0195818 | A1* | 7/2015 | Davydov | H04L 27/3494 370/329 |
| 2015/0289237 | A1* | 10/2015 | Kim | H04L 27/26 370/329 |

OTHER PUBLICATIONS

LG Electronics: "Specification impact on DL signalling for 256QAM support;" 3GPP draft; R1-135472 DL Signalling for 256 QAM; 3rd Generation Partnership Project; vol. RAN WG1, San Francisco, CA, USA; Nov. 13, 2013.

Motorola: "Limited Buffer Rate Matching Performance Analysis;" 3GPP draft; R1-080057 LBRM Performance Analysis; 3rd Generation Partnership Project; vol. RAN WG1; Sevilla, Spain; Jan. 9, 2008.

3GPP TS 36.306 V11.1.0; 3rd Generation Partnership Project; Technical Specification Group Radio Access Network; Evolved Universal Terrestrial Radio Access (E-UTRA).

* cited by examiner

| SB0 | SB1 | SB2 | SB3 | SB4 | SB5 | SB6 | SB7 |
|-----|-----|-----|-----|-----|-----|-----|-----|

Fig. 6

| SB0a | SB1a | SB2a | SB3a | SB4a | SB5a | SB6a | SB7a |
|------|------|------|------|------|------|------|------|
| SB0b | SB1b | SB2b | SB3b | SB4b | SB5b | SB6b | SB7b |

Fig. 7

256 QUADRATURE AMPLITUDE MODULATION USER EQUIPMENT CATEGORY HANDLING

CROSS-REFERENCE TO RELATED APPLICATIONS

This application is a 371 of PCT/IB2015/050629, filed Jan. 27, 2015, which claims the benefit of U.S. Provisional Application No. 61/933,410, filed Jan. 30, 2014, the disclosures of which are fully incorporated herein by reference.

TECHNICAL FIELD

Particular embodiments relate generally to modulation of wireless signals in communication networks, and more particularly to supporting 256 quadrature amplitude modulation (256QAM) for existing user equipment category types while retaining the advantages of 256QAM.

BACKGROUND

Long Term Evolution (LTE) uses orthogonal frequency division multiplexing (OFDM) in the downlink and DFT-spread OFDM in the uplink. FIG. 1 illustrates an example OFDM symbol. The basic LTE downlink physical resource comprises a time-frequency grid as illustrated in FIG. 1, where each resource element corresponds to one OFDM subcarrier during one OFDM symbol interval.

FIG. 2 illustrates an example radio frame. In the time domain, LTE downlink transmissions are organized into radio frames of 10 ms, each radio frame consisting of ten equally-sized subframes of length 1 ms. FIG. 2 is a schematic diagram of this LTE time-domain structure.

Furthermore, resource allocation in LTE is typically described in terms of resource blocks, where a resource block corresponds to one slot (0.5 ms) in the time domain and 12 contiguous subcarriers in the frequency domain. A pair of two adjacent resource blocks in the time direction (1.0 ms) is known as a resource block pair. Resource blocks are numbered in the frequency domain, starting with 0 from one end of the system bandwidth.

LTE comprises virtual resource blocks (VRB) and physical resource blocks (PRB). Resources are allocated to a UE is in terms of VRB pairs. Resource allocations may be localized or distributed. For localized resource allocation, a VRB pair is directly mapped to a PRB pair, and thus two consecutive and localized VRB are placed as consecutive PRBs in the frequency domain. For distributed resource allocation, the distributed VRBs are not mapped to consecutive PRBs in the frequency domain, which provides frequency diversity for data channels transmitted using these distributed VRBs.

Downlink transmissions are dynamically scheduled. For each subframe, a base station transmits control information about which terminals will receive data on which resource blocks in that downlink subframe. This control signaling is typically transmitted in the first 1, 2, 3 or 4 OFDM symbols in each subframe. The number of symbols (i.e., 1, 2, 3 or 4) is known as the Control Format Indicator (CFI). Downlink subframes also include common reference symbols, which are known by the receiver and are used for coherent demodulation, such as demodulation of control information.

FIG. 3 illustrates an example downlink subframe. The illustrated subframe includes three OFDM symbols (CFI=3) for control information. For some LTE releases, the resource assignments described above may also be scheduled on the enhanced Physical Downlink Control Channel (EPDCCH).

Wireless systems, such as LTE, may use link adaptation to adapt parameters of a radio link based on current conditions of the radio link. Fast link adaptation to fading channel conditions may enhance system throughput capacity as well as user experience and quality of service. In fast link adaptation, channel conditions are fed back from the receiver to the transmitter. The feedback may comprise, for example, signal to noise ratio (SNR), signal to interference and noise ratio (SINR), received signal level (power or strength), supportable data rates, supportable combination of modulation and coding rates, and/or supportable throughput. The feedback information may apply to an entire frequency band as in W-CDMA or to a specific portion of it as in OFDM systems such as LTE. The term "channel quality indicator" (CQI) may refer to any such feedback information or messages containing such information.

In LTE downlink, CQI messages are fed back from a mobile station to a base station to help the base station determine a radio resource allocation. The feedback information can be used to determine transmission scheduling among multiple receivers, to select suitable transmission schemes (such as the number of transmit antennas to activate), to allocate appropriate amount of bandwidth, and to form supportable modulation and coding rate for the intended receiver. In LTE uplink, a base station can estimate a channel quality from demodulation reference symbols or sounding reference symbols transmitted by a mobile station.

Table 1 indicates a range of CQI report messages for LTE systems. The CQI table supports modulation and coding scheme (MCS) adaptation over wide-band wireless communication channels. The transition points from a lower-order modulation to a higher-order modulation are determined based on link performance evaluation. These specific transition points between different modulations may provide guidelines for optimal system operation.

TABLE 1

4-bit CQI Table for LTE (Reproduced from Table 7.2.3-1 of 3GPP TS 36.213)

| CQI index | Modulation | Coding rate × 1024 | Spectral efficiency (bits per symbol) |
|---|---|---|---|
| 0 | | out of range | |
| 1 | QPSK | 78 | 0.15 |
| 2 | QPSK | 120 | 0.23 |
| 3 | QPSK | 193 | 0.38 |
| 4 | QPSK | 308 | 0.60 |
| 5 | QPSK | 449 | 0.88 |
| 6 | QPSK | 602 | 1.18 |
| 7 | 16QAM | 378 | 1.48 |
| 8 | 16QAM | 490 | 1.91 |
| 9 | 16QAM | 616 | 2.47 |
| 10 | 64QAM | 466 | 2.73 |
| 11 | 64QAM | 567 | 3.32 |
| 12 | 64QAM | 666 | 3.90 |
| 13 | 64QAM | 772 | 4.52 |
| 14 | 64QAM | 873 | 5.12 |
| 15 | 64QAM | 948 | 5.55 |

Based on CQI reports from a mobile station, a base station can choose the best MCS to transmit data on the physical downlink shared channel (PDSCH). The MCS information is conveyed to the selected mobile station in a 5-bit "modulation and coding scheme" field ($I_{MCS}$) of the downlink control information. The MCS information may be conveyed by an MCS index.

Table 2 indicates an association between an MCS index and a particular MCS and transport block size (TBS) index. In conjunction with the total number of allocated resource blocks, the TBS index further determines the transport block size used in the PDSCH transmission. The last three MCS entries in Table 2 are for hybrid automatic repeat request (HARQ) re-transmissions. For repeat transmissions, the TBS remains the same as the original transmission.

TABLE 2

Modulation and transport block size index table for LTE PDSCH
(Reproduced from Table 7.1.7.1-1 of 3GPP TS 36.213)

| MCS Index ($I_{MCS}$) | Modulation ($Q_m$) | Transport block size index ($I_{TBS}$) |
|---|---|---|
| 0 | QPSK | 0 |
| 1 | QPSK | 1 |
| 2 | QPSK | 2 |
| 3 | QPSK | 3 |
| 4 | QPSK | 4 |
| 5 | QPSK | 5 |
| 6 | QPSK | 6 |
| 7 | QPSK | 7 |
| 8 | QPSK | 8 |
| 9 | QPSK | 9 |
| 10 | 16QAM | 9 |
| 11 | 16QAM | 10 |
| 12 | 16QAM | 11 |
| 13 | 16QAM | 12 |
| 14 | 16QAM | 13 |
| 15 | 16QAM | 14 |
| 16 | 16QAM | 15 |
| 17 | 64QAM | 15 |
| 18 | 64QAM | 16 |
| 19 | 64QAM | 17 |
| 20 | 64QAM | 18 |
| 21 | 64QAM | 19 |
| 22 | 64QAM | 20 |
| 23 | 64QAM | 21 |
| 24 | 64QAM | 22 |
| 25 | 64QAM | 23 |
| 26 | 64QAM | 24 |
| 27 | 64QAM | 25 |
| 28 | 64QAM | 26 |
| 29 | QPSK | reserved |
| 30 | 16QAM | |
| 31 | 64QAM | |

Specific TBSs for different numbers of allocated radio blocks are listed in 3GPP TS 36.213. These TBSs are designed to achieve spectral efficiencies based on the CQI reports. More specifically, the TBSs are selected to achieve the spectral efficiencies shown in Table 3 when the number of available OFDM symbols for PDSCH is 11.

TABLE 3

Spectral efficiency target for LTE with 11 OFDM symbols for PDSCH

| MCS Index ($I_{MCS}$) | Modulation ($Q_m$) | Spectral efficiency (bits per symbol) |
|---|---|---|
| 0 | QPSK | 0.23 |
| 1 | QPSK | 0.31 |
| 2 | QPSK | 0.38 |
| 3 | QPSK | 0.49 |
| 4 | QPSK | 0.60 |
| 5 | QPSK | 0.74 |
| 6 | QPSK | 0.88 |
| 7 | QPSK | 1.03 |
| 8 | QPSK | 1.18 |
| 9 | QPSK | 1.33 |
| 10 | 16QAM | 1.33 |
| 11 | 16QAM | 1.48 |
| 12 | 16QAM | 1.70 |

TABLE 3-continued

Spectral efficiency target for LTE with 11 OFDM symbols for PDSCH

| MCS Index ($I_{MCS}$) | Modulation ($Q_m$) | Spectral efficiency (bits per symbol) |
|---|---|---|
| 13 | 16QAM | 1.91 |
| 14 | 16QAM | 2.16 |
| 15 | 16QAM | 2.41 |
| 16 | 16QAM | 2.57 |
| 17 | 64QAM | 2.57 |
| 18 | 64QAM | 2.73 |
| 19 | 64QAM | 3.03 |
| 20 | 64QAM | 3.32 |
| 21 | 64QAM | 3.61 |
| 22 | 64QAM | 3.90 |
| 23 | 64QAM | 4.21 |
| 24 | 64QAM | 4.52 |
| 25 | 64QAM | 4.82 |
| 26 | 64QAM | 5.12 |
| 27 | 64QAM | 5.33 |
| 28 | 64QAM | 6.25 |

LTE uses HARQ with incremental redundancy. Instead of re-transmitting the same portion of a codeword, different redundancy versions are re-transmitted which provides an extra gain over Chase combining.

If terminal complexity and cost were not a factor, a receiver could include a soft buffer large enough to store all the received soft values. When complexity and cost are concerns, however, the soft buffer size in a terminal is generally limited. For high rate transmissions where a transmitter sends large codewords, a UE may not be able store the complete codeword in its limited buffer. Therefore, the eNB and terminal both need to know the soft buffer size. Otherwise, the eNB might transmit coded bits that the UE cannot store, or the UE may not know these are other bits and confuse them with bits it stores.

FIG. 4 illustrates an example codeword. The illustrated example depicts a simplified complete codeword and a number of soft bits that the terminal can store. The complete codeword comprises systematic bits and parity bits. A soft buffer may be sized to store a subset of these bits. If the eNB and the terminal both know the soft buffer size, then the eNB will not transmit coded bits that the terminal cannot store. The eNB knows how many coded bits the terminal stores, and thus the eNB can use those bits for transmissions or re-transmissions.

FIG. 5 illustrates an example circular buffer for transmission and re-transmission of a transport block. The complete circle corresponds to the soft buffer size of a terminal and not to the entire codeword. In a first transmission, depending on the code rate, the eNB transmits some/all of the systematic bits and none/some of the parity bits. In a re-transmission, the starting position is changed and the eNB transmits bits corresponding to another part of the circumference.

In particular LTE releases, each terminal includes up to eight HARQ processes per component carrier and each HARQ process may include up to two sub-processes for supporting dual-codeword MIMO transmissions. The particular releases divide the available soft buffer equally into the configured number of HARQ processes. Each of the divided soft buffers can be used to store soft values of the received codewords. In case of dual-codeword MIMO transmission, the divided soft buffer may be further divided equally to store the soft values of the two received codewords.

FIG. 6 illustrates an example soft buffer divided into eight portions. The illustrated example depicts buffer allocation for a single-codeword transmission mode. Each buffer corresponds to a codeword. Such an allocation may represent an LTE soft buffer allocation for a PDSCH transmission mode other than modes 3, 4, 8, 9 or 10.

FIG. 7 illustrates an example soft buffer divided into sixteen portions. The illustrated example depicts buffer allocation for a dual-codeword transmission mode. Each buffer is half the size of the corresponding buffer in FIG. 6. Such an allocation may represent an LTE soft buffer allocation for PDSCH transmission modes 3, 4, 8, 9 or 10.

3GPP documentation specifies that the soft buffer size assumed by the encoder is calculated as below:

The circular buffer of length $K_w = 3K_\Pi$ for the r-th coded block is generated as follows:

$w_k = v_k^{(0)}$ for $k = 0, \ldots, K_\Pi - 1$ $w_{K_\Pi + 2k} = v_k^{(1)}$ for $k = 0, \ldots, K_\Pi - 1$ $w_{K_\Pi + 2k + 1} = v_k^{(2)}$ for $k = 0, \ldots, K_\Pi - 1$ Denote the soft buffer size for the transport block by $N_{IR}$ bits and the soft buffer size for the r-th code block by $N_{cb}$ bits. The size $N_{cb}$ is obtained as follows:

$$N_{cb} = \min\left(\left\lfloor \frac{N_{IR}}{C} \right\rfloor, K_w\right)$$

for DL-SCH and PCH transport channels and
$N_{cb} = K_w$ for UL-SCH and MCH transport channels, where $N_{IR}$ is equal to:

$$N_{IR} = \left\lfloor \frac{N_{soft}}{K_C \cdot K_{MIMO} \cdot \min(M_{DL\_HARQ}, M_{limit})} \right\rfloor$$

where:
If the UE signals ue-Category-v1020, and is configured with transmission mode 9 or transmission mode 10 for the DL cell, $N_{soft}$ is the total number of soft channel bits according to the UE category indicated by ue-Category-v1020. Otherwise, $N_{soft}$ is the total number of soft channel bits according to the UE category indicated by ue-Category (without suffix).

If $N_{soft} = 35982720$,
$K_C =$
elseif $N_{soft} = 3654144$ and the UE is capable of supporting no more than a maximum of two spatial layers for the DL cell,
$K_C = 2$
else
$K_C = 1$
End if.

$K_{MIMO}$ is equal to 2 if the UE is configured to receive PDSCH transmissions based on transmission modes 3, 4, 8, 9 or 10 as defined in the 3GPP documentation, and is equal to 1 otherwise.

$M_{DL\_HARQ}$ is the maximum number of downlink HARQ processes as defined in the 3GPP documentation.

$M_{limit}$ is a constant equal to 8.

LTE uses hybrid-ARQ (HARQ), where, after receiving downlink data in a subframe, a terminal attempts to decode the data and reports back to the base station whether the decoding was successful (ACK) or not (NACK). After an unsuccessful decoding attempt, the base station may retransmit the data.

In a subframe where the UE has an uplink grant for PUSCH transmission, the UE may incorporate the HARQ feedback message in the PUSCH. If the UE is not assigned an uplink resource for PUSCH transmission in a subframe, then the UE may use the Physical Uplink Control Channel (PUCCH) to send the HARQ feedback message.

In LTE systems up to release 11, the set of modulation schemes for both downlink and uplink includes Quadrature Phase Shift Keying (QPSK), 16 Quadrature Amplitude Modulation (16QAM) and 64 Quadrature Amplitude Modulation (64QAM), corresponding to 2, 4 and 6 bits per modulation symbol, respectively. In LTE, for scenarios with high SINR, such as small cell environments with terminals close to the serving eNB, providing a higher data rate with given transmission bandwidth may be accomplished by using higher order modulation that allows for more bits of information to be carried per modulation symbol. For example, with the introduction of 256QAM, 8 bits are transmitted per modulation symbol. This can improve peak data rate maximum by thirty-three percent as shown in FIG. 8.

FIG. 8 illustrates example bit information for particular modulation schemes at particular SNR levels. The illustrated lines on the graph include QPSK line 80, 16QAM line 82, 64QAM line 84 and 256QAM line 86.

As illustrated, 256QAM provides gains when SINR is sufficiently high in certain scenarios. In practice, the performance of 256QAM is sensitive to transmitter EVM (Error vector magnitude) and Rx impairments.

In 3GPP, support for 256QAM may impact the CQI/MCS/TBS table design and UE category handling. A UE category defines a combined uplink and downlink capability. The parameters set by the UE category are defined in subclauses 4.1-4.2 in 3GPP TS 36.306 V11.1.0. In section 4.2 of the above standard, downlink capabilities for different UE categories are described. Particular capabilities include the "Maximum number of DL-SCH transport block bits received within a TTI" and the "Total number of soft channel bits."

The field "Maximum number of DL-SCH transport block bits received within a TTI" defines how many information bits a UE is capable of receiving per TTI or subframe. A large value corresponds to a higher decoding capability of the UE. The value corresponds to the use of the largest transport block size together with the highest modulation order used.

The field "Maximum number of bits of a DL-SCH transport block received within a TTI" defines the total number of soft channel bits available for HARQ processing. This number does not include the soft channel bits required by the dedicated broadcast HARQ process for the decoding of system information.

The field "Total number of soft channel bits" defines the value for the parameter $N_{soft}$ described above. The parameter controls how many soft channel bits a UE can store (i.e., how many received encoded bits it can store). A higher value corresponds to a larger UE soft buffer size. The parameter is also used for transport block encoding at an eNB.

UE categories 6 to 8 were introduced in LTE release 10, while the remaining UE categories were introduced in release 8. To be backwards compatible with UE categories 6 to 8, a UE indicating category 6 or 7 shall also indicate category 4 and a UE indicating category 8 shall also indicate category 5. Table 4 indicates various UE categories and their parameters.

TABLE 4

Downlink physical layer parameter values set by the field UE-Category

| UE Category | Maximum number of DL-SCH transport block bits received within a TTI (Note) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers) 75376 (2 layers) | 3654144 | 2 or 4 |
| Category 7 | 301504 | 149776 (4 layers) 75376 (2 layers) | 3654144 | 2 or 4 |
| Category 8 | 2998560 | 299856 | 35982720 | 8 |

(Note): In carrier aggregation operation, the DL-SCH processing capability can be shared by the UE with that of MCH received from a serving cell. If the total eNB scheduling for DL-SCH and an MCH in one serving cell at a given TTI is larger than the defined processing capability, the prioritization between DL-SCH and MCH is left up to UE implementation.

SUMMARY

This disclosure describes a cost-efficient manner to introduce 256QAM with respect to existing UE categories by using larger transport block sizes with existing soft buffer sizes.

According to some embodiments, a method of decoding a transport block in a wireless device comprises receiving a first transmission of a transport block. The transport block is modulated according to a first modulation coding scheme. The method further comprises determining a number of soft channel bits SB 1 in the first transmission of the transport block based at least on a category type of the wireless device. The category type of wireless device is capable of supporting the first modulation coding scheme and a second modulation coding scheme of a different order than the first modulation scheme and both the first and second modulation schemes are associated with the same number of soft channel bits and soft buffer size. The method further comprises storing SB1 soft channel bits of the first transmission of the transport block in a soft buffer.

In particular embodiments, the method comprises receiving a second transmission of the transport block. The second transmission is modulated according to the second modulation coding scheme. The method further comprises determining a number of soft channel bits SB2 in the second transmission of the transport block based at least on the category type of the wireless device wherein SB2 equals SB1 and storing SB2 soft channel bits of the second transmission of the transport block in the soft buffer.

In particular embodiments, upon a failure to decode the first transmission block, the method further comprises combining the second transmission block with the stored SB1 soft channel bits of the first transport block.

In particular embodiments, the first modulation scheme is a 256 Quadrature Amplitude Modulation (256QAM) scheme. In particular embodiments, the second modulation scheme is a 64 Quadrature Amplitude Modulation scheme (64QAM).

According to some embodiments, a method of transmitting a transport block in a wireless network comprises determining a first modulation coding scheme for a first transmission of the transport block and determining a number of soft channel bits SB1 for the transport block based at least on a category type of a wireless device. The category type of wireless device is capable of supporting the first modulation coding scheme and a second modulation coding scheme of a different order than the first modulation scheme and both the first and second modulation schemes are associated with the same number of soft channel bits and soft buffer size. The method further comprises encoding the first transport block according to the first modulation coding scheme and the determined number of soft channel bits SB1 and transmitting the transport block to a wireless network element.

In particular embodiments, the method further comprises determining a number of soft channel bits SB2 for the transport block based at least on the category type of the wireless device, wherein SB2 equals SB1; encoding the transport block according to the second modulation coding scheme and the determined number of soft channel bits SB2; and transmitting the transport block to the wireless device.

In particular embodiments, the first modulation coding scheme is a 256QAM scheme. In particular embodiments, the second modulation coding scheme is a 64QAM scheme.

According to some embodiments, a method of performing a Hybrid Automatic Repeat Request (HARQ) process comprises receiving, by a wireless device executing a HARQ process, a first transport block encoded according to a category type of the wireless device and a first modulation coding scheme; decoding, by the HARQ process, the first transport block using a number of soft bits N; receiving, by the wireless network element, a second transport block encoded according to the category type and a second modulation coding scheme different from the first modulation coding scheme; and decoding, by the HARQ process, the second transport block using the number of soft bits N.

In particular embodiments, an operational state of the HARQ process is not reset after determining the second modulation scheme is different than the first modulation scheme and before decoding the second transmission block.

Particular embodiments may exhibit some of the following technical advantages. Particular embodiments may include low cost UE implementations with support for 256QAM capabilities and faster time to market for 256QAM support in LTE. In particular embodiments, link performance may be used more efficiently to improve overall system performance. Other technical advantages will be readily apparent to one skilled in the art from the following figures, description and claims.

BRIEF DESCRIPTION OF THE DRAWINGS

For a more complete understanding of the present invention and its features and advantages, reference is now made to the following description, taken in conjunction with the accompanying drawings, in which.

a DL-SCH transport block received within a TTI may increase from 75376 to 88892 with the introduction of 256QAM support. For a UE supporting maximum four spatial multiplexing layers, the maximum number of bits of a DL-SCH transport block received within a TTI may increase from 149776 to 177456. For a UE supporting maximum eight spatial multiplexing layers, the maximum number of bits of a DL-SCH transport block received within a TTI may increase from 299856 to 354936.

A possible solution to handle these increased numbers of received bits is to define new UE categories with both increased data rate and additional total soft channel bits. Table 5 illustrates an example of new UE category types (e.g., 14-18) for supporting 256QAM.

TABLE 5

Downlink physical layer parameter values set by the field ue-Category with larger total number of soft channel bits for supporting 256QAM.

| UE Category | Maximum number of DL-SCH transport block bits received within a TTI (Note) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |
| Category 3 | 102048 | 75376 | 1237248 | 2 |
| Category 4 | 150752 | 75376 | 1827072 | 2 |
| Category 5 | 299552 | 149776 | 3667200 | 4 |
| Category 6 | 301504 | 149776 (4 layers) 75376 (2 layers) | 3654144 | 2 or 4 |
| Category 7 | 301504 | 149776 (4 layers) 75376 (2 layers) | 3654144 | 2 or 4 |
| Category 8 | 2998560 | 299856 | 35982720 | 8 |
| Category 14 | 177792 | 88896 | 2154240 | 2 |
| Category 15 | 354912 | 177456 | 4298496 | 4 |
| Category 16 | 355584 | 177456 (4 layers) 88896 (2 layers) | 4308480 | 2 or 4 |
| Category 17 | 355584 | 177456 (4 layers) 88896 (2 layers) | 4308480 | 2 or 4 |
| Category 18 | 3549360 | 354936 | 42592320 | 8 |

Figure 1:
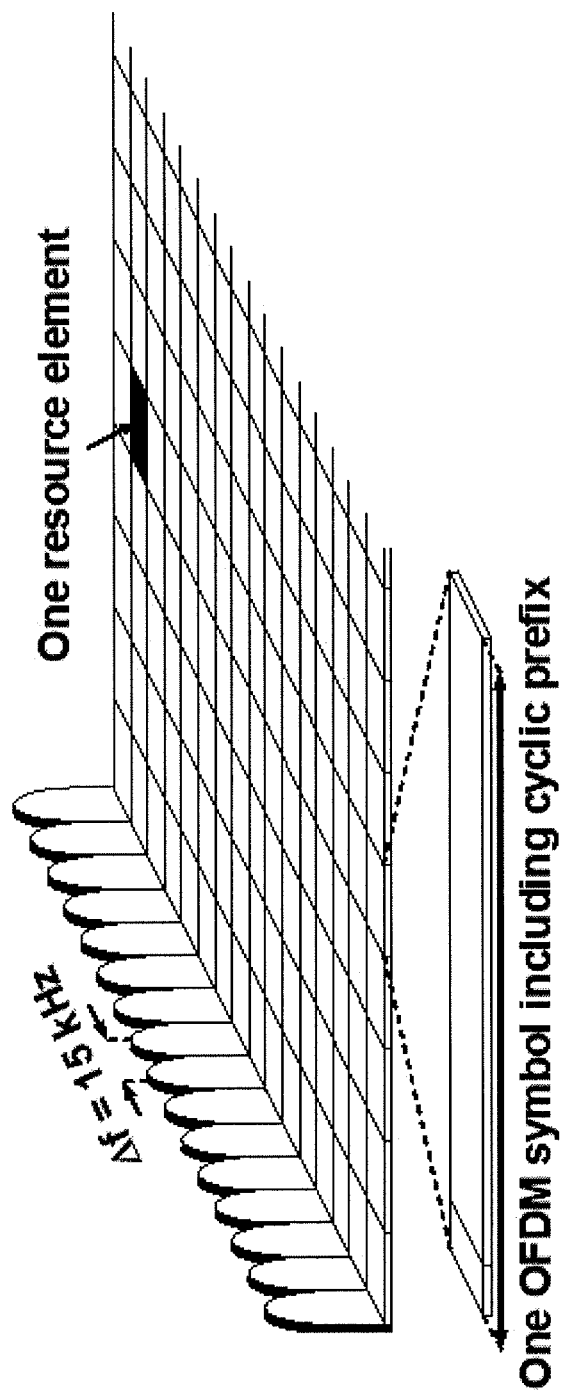
FIG. 1 illustrates an example Orthogonal Frequency-Division Multiplexed (OFDM) symbol.
Figure 2:
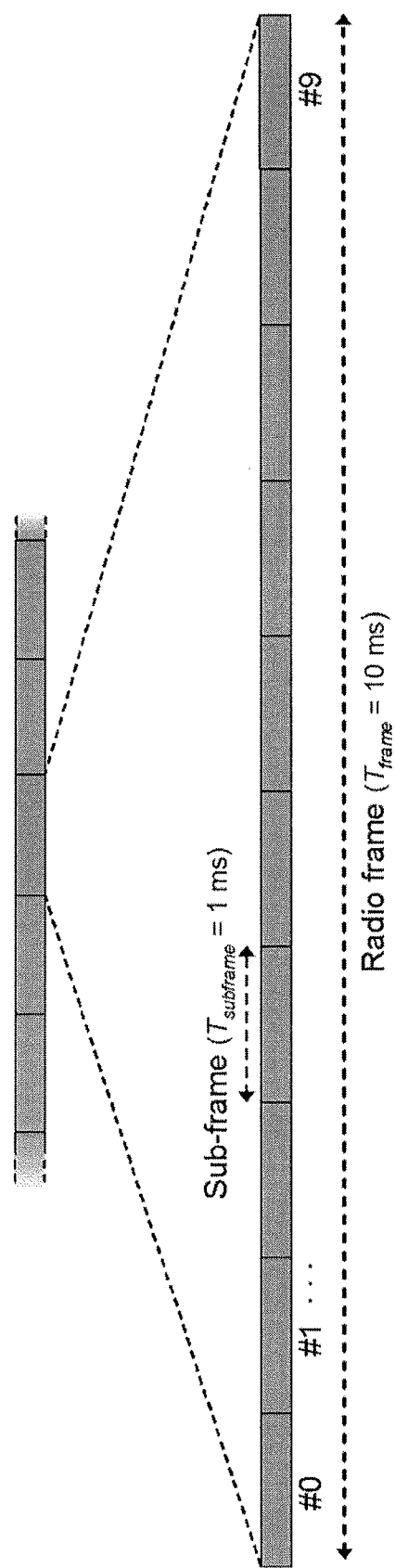
FIG. 2 illustrates an example radio frame.
Figure 3:
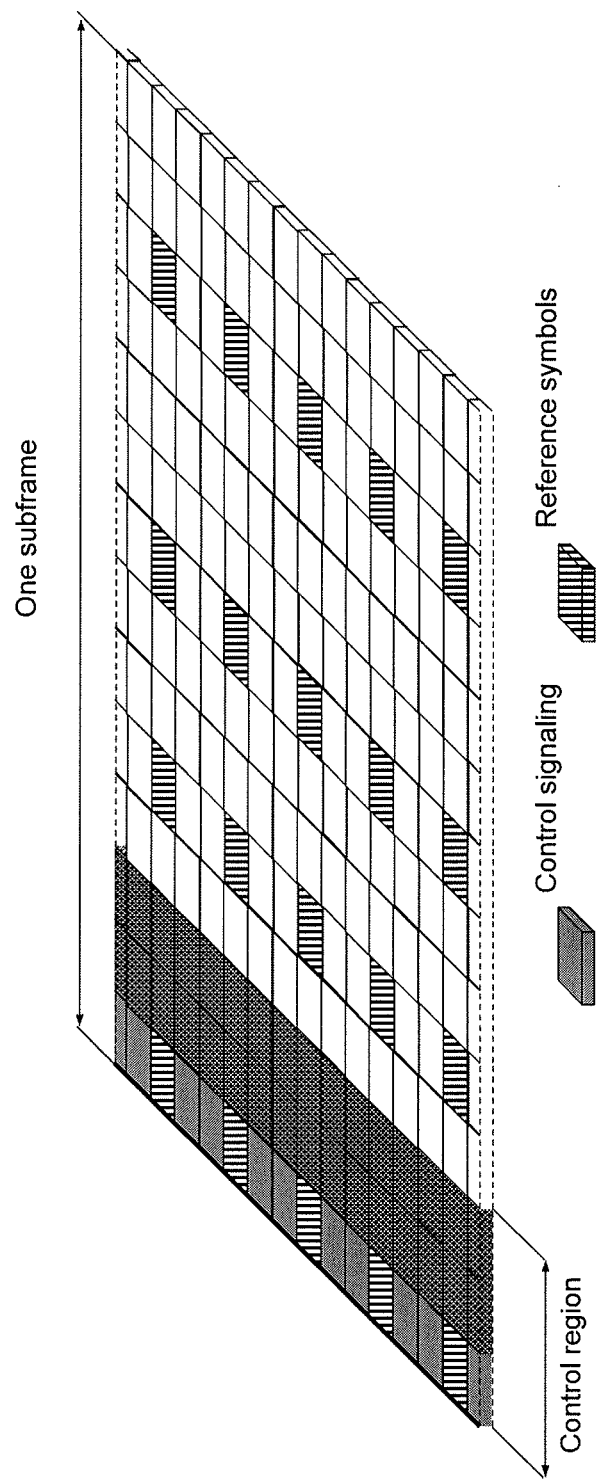
FIG. 3 illustrates an example downlink subframe.
Figure 5:
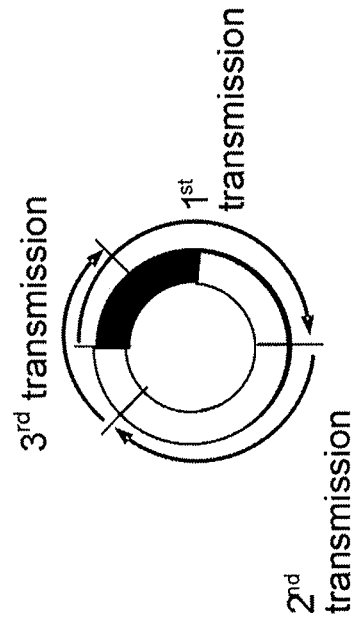
Figure 4:
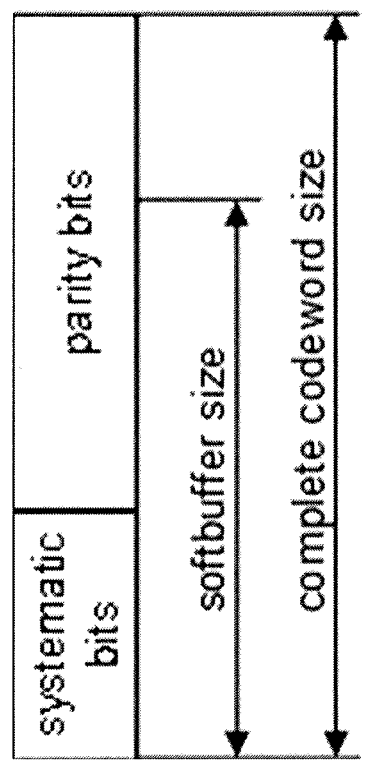
FIG. 4 illustrates an example codeword.
Figure 8:
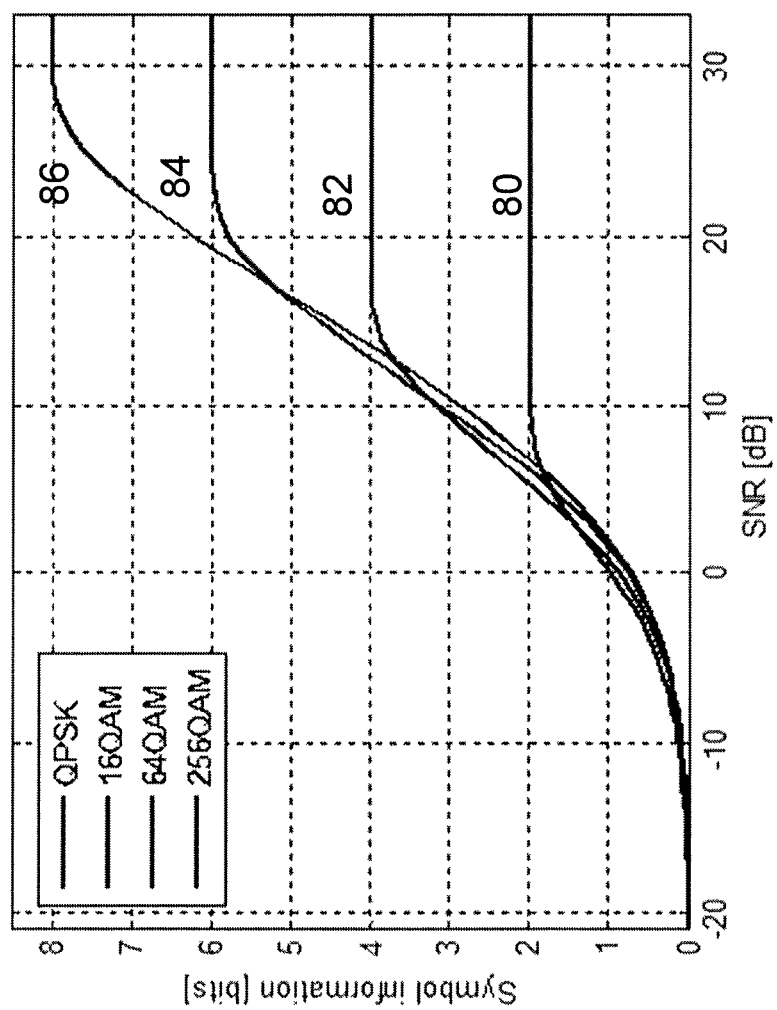
Figure 9:
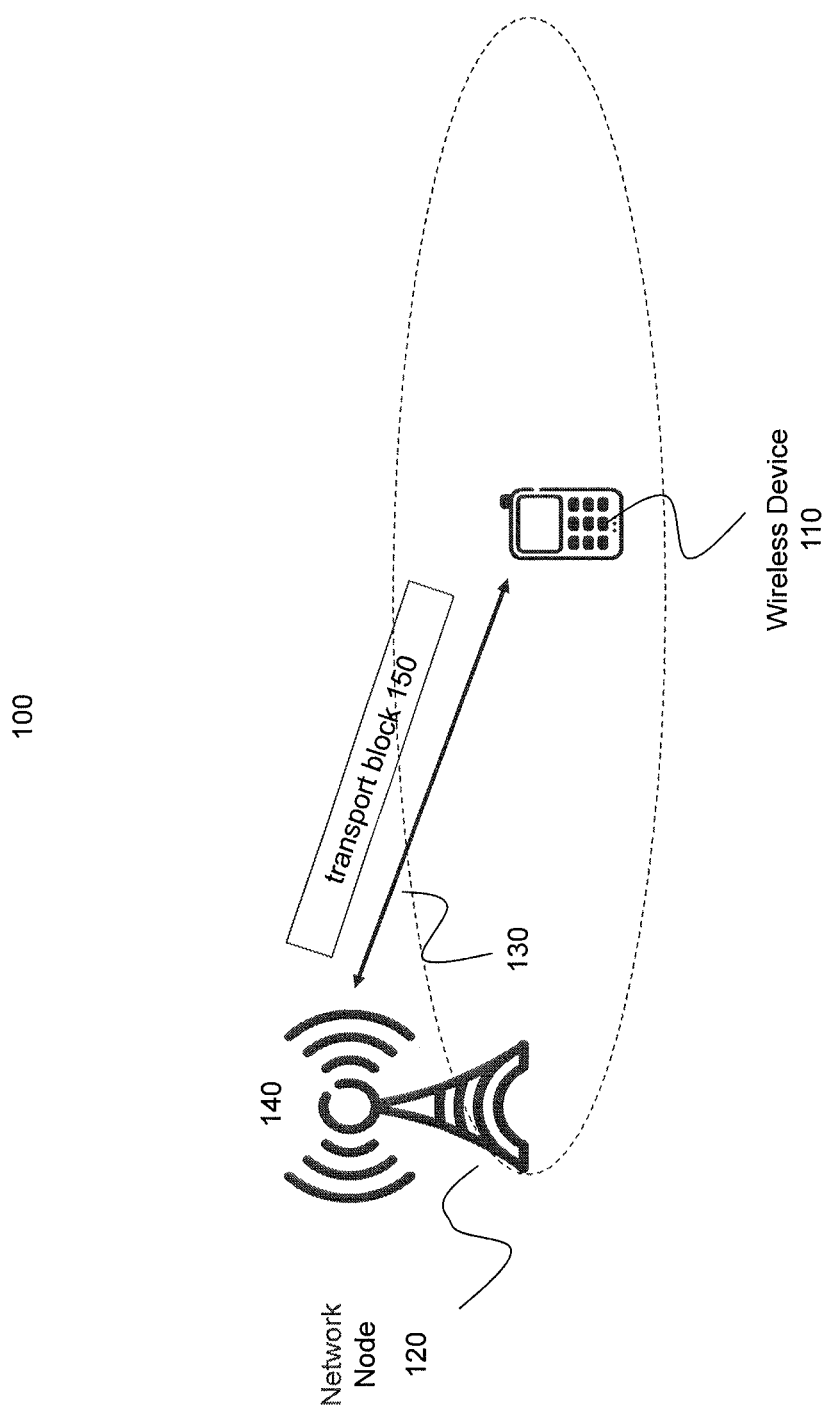
Figure 11:
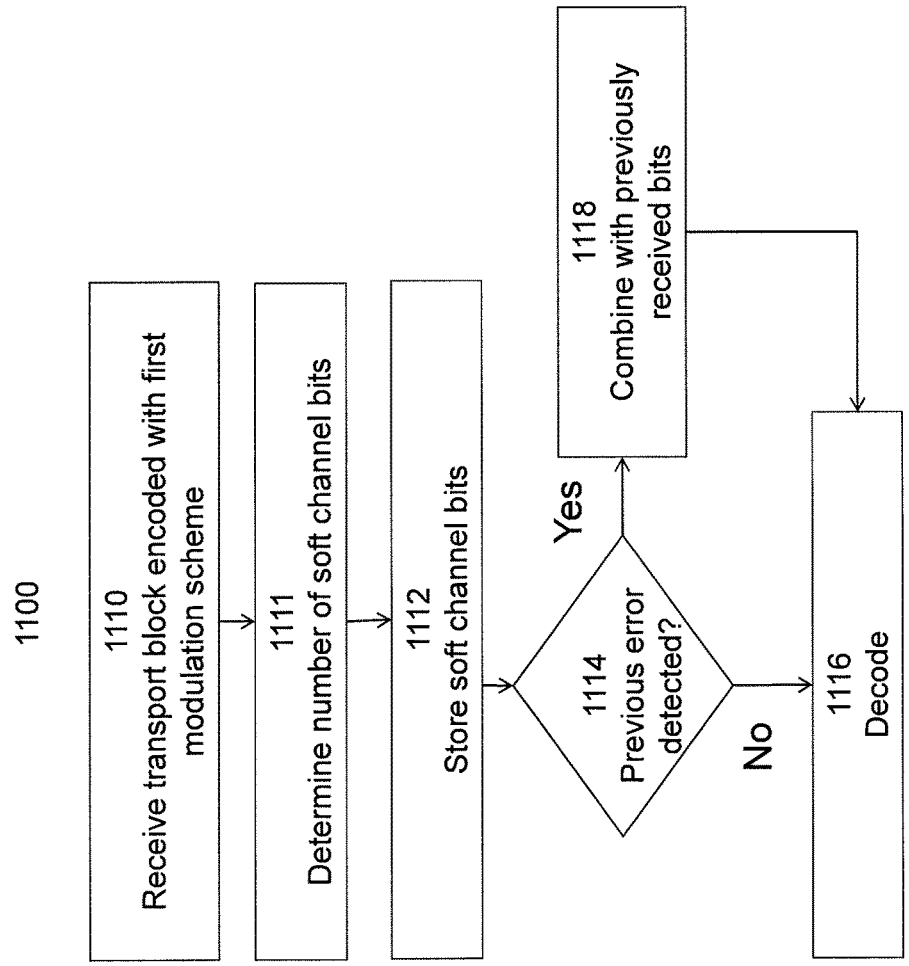
Figure 10:
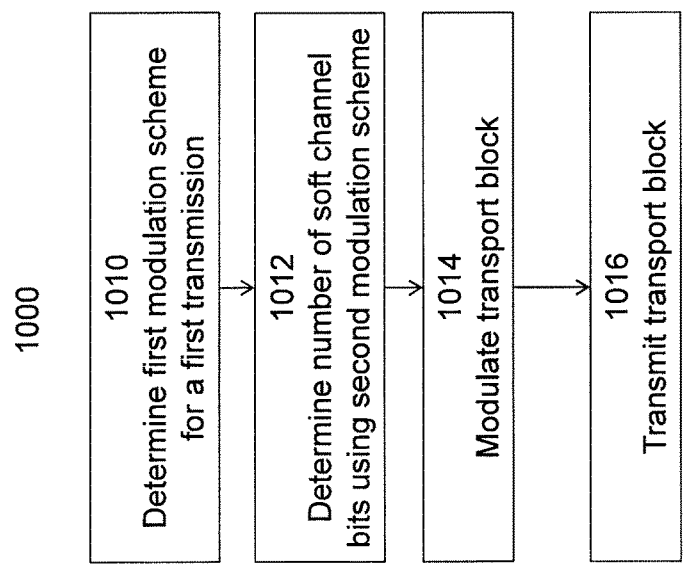
Figure 12:
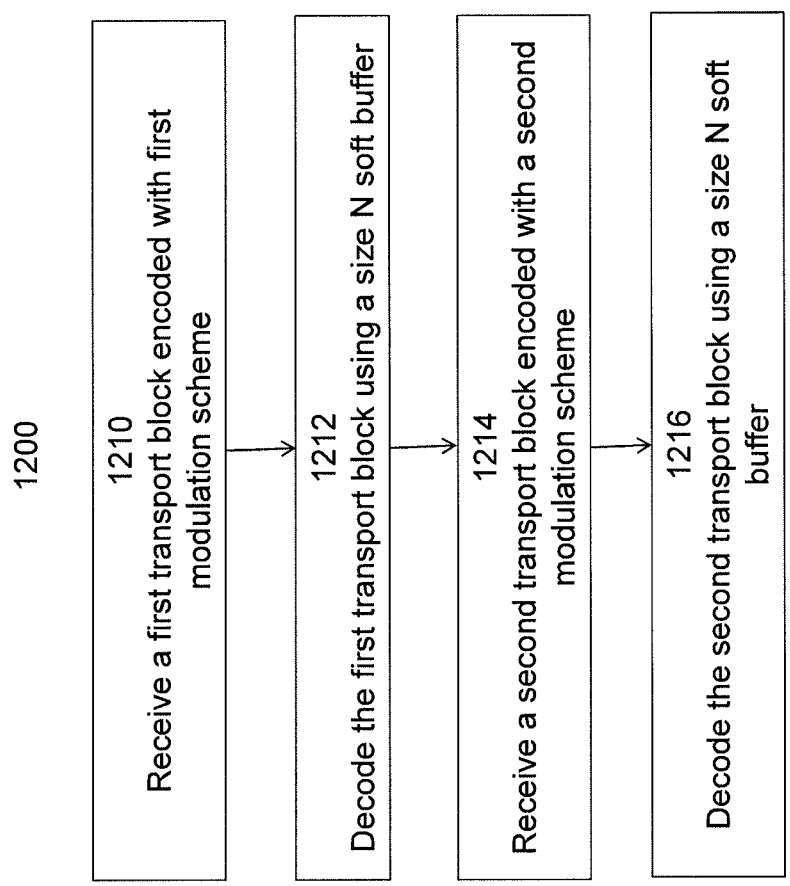
Figure 14:
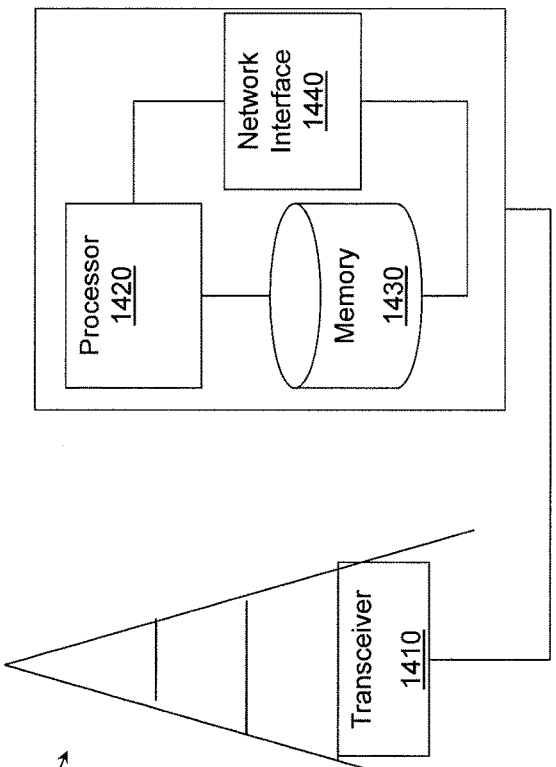
Figure 13:
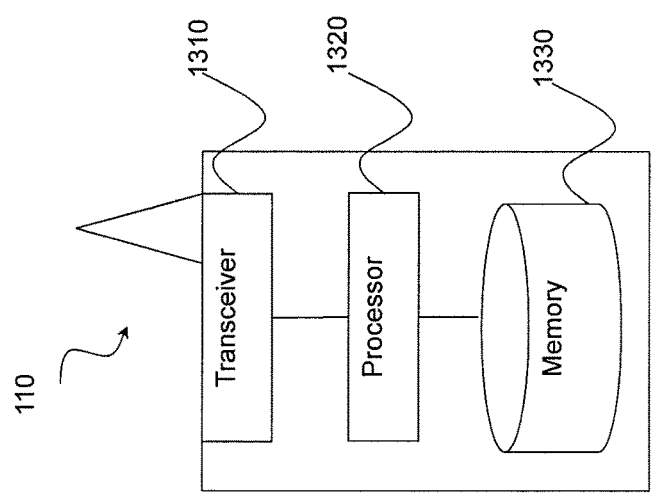

FIG. 5 illustrates an example circular buffer for transmission and re-transmission of a transport block;
FIG. 6 illustrates an example soft buffer divided into eight portions;
FIG. 7 illustrates an example soft buffer divided into sixteen portions;
FIG. 8 illustrates example bit information for various modulation schemes at various signal to noise levels;
FIG. 9 is a block diagram illustrating an example of a wireless network, according to some embodiments;
FIG. 10 is a flowchart of an example method of transmitting a transport block, according to some embodiments;
FIG. 11 is a flowchart of an example method of receiving a transport block, according to some embodiments;
FIG. 12 is a flowchart of an example method of performing a hybrid automatic repeat request process;
FIG. 13 is a block diagram illustrating an example embodiment of a wireless device; and
FIG. 14 is a block diagram illustrating an example embodiment of a radio network node.

DETAILED DESCRIPTION

256QAM supports higher data rates than currently supported in LTE. For a UE supporting a maximum of two spatial multiplexing layers, the maximum number of bits of This solution, however, relies on increasing the memory hardware of a UE to store the additional received bits. For example, a category 16 UE would need enough memory to store 4308480 soft channel bits instead of 3654144 soft channel bits for a category 6 UE. Such a solution can be expensive.

Increased hardware costs may not be justified, however, if 256QAM is only available in particular scenarios. For example, 256QAM may be used when a UE is located in favorable radio conditions (e.g., when the UE is served by a nearby eNB with no other interfering radio signals in the frequency band). If such conditions occur infrequently, additional hardware costs may not be justified for the limited benefit.

An object of the present disclosure is to obviate at least these disadvantages and provide an improved method to support 256QAM with existing UE category types. Particular embodiments described below may include low cost UE implementations with support for 256QAM capabilities and faster time to market for 256QAM support in LTE.

Particular embodiments are described with reference to FIGS. 1-14 of the drawings, like numerals being used for like and corresponding parts of the various drawings. LTE is used throughout this disclosure as an example cellular system, but the ideas presented herein apply to any wireless communication system.

FIG. 9 is a block diagram illustrating an example of a network, according to a particular embodiment. Network 100 includes wireless network elements such as radio network node 120 (such as a base station or eNodeB) and wireless devices 110 (such as mobile phones, smart phones, laptop computers, tablet computers, MTC, or any other devices that can provide wireless communication). In general, wireless devices 110 that are within coverage of radio network node 120 communicate with radio network node 120 by transmitting and receiving wireless signals 130. For example, wireless devices 110 and radio network node 120 may communicate wireless signals 130 containing voice traffic, data traffic, and/or control signals. Wireless signals 130 may include both downlink transmissions (from radio network node 120 to wireless devices 110) and uplink transmissions (from wireless devices 110 to radio network node 120). In the physical layer, wireless signals 130 may comprise transport blocks 150.

Transport blocks 150 may be modulated according to various modulation schemes such as QPSK, 16QAM, 64QAM, 256QAM or any other suitable modulation scheme. The modulation scheme of transport block 150 may vary over time according to radio conditions. For example, radio network node 120 may modulate transport block 150 with a higher order modulation scheme (e.g., 256QAM) under favorable radio conditions or may modulate transport block 150 with a lower order modulation scheme (e.g., 16QAM) under less favorable radio conditions.

Radio network node 120 transmits and receives wireless signals 130 using antenna 140. In particular embodiments, radio network node 120 may comprise multiple antennas 140. For example, radio network node 120 may comprise a multi-input multi-output (MIMO) system with two, four, or eight antennas 140.

In network 100, each radio network node 120 may use any suitable radio access technology, such as long term evolution (LTE), LTE-Advanced, UMTS, HSPA, GSM, cdma2000, WiMax, WiFi, and/or other suitable radio access technology. Network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 13 below. Similarly, a radio network node may include any suitable combination of hardware and/or software. For example, in particular embodiments, a radio network node, such as radio network node 120, may include the components described with respect to FIG. 14 below.

According to some embodiments, this disclosure describes a cost-efficient manner to include 256QAM within existing UE categories. In some embodiments, these benefits are achieved by increasing the maximum size of a transport block to support the higher data rate of 256QAM, but not increasing the number of soft channel bits used for 256QAM. For example, support for 256QAM may include supporting increased values for the "Maximum number of DL-SCH transport block bits received within a TTI" and "Maximum number of bits of a DL-SCH transport block received within a TTI" for some UE categories. Increased values in these two fields may facilitate a radio network node using a larger transport block size to send higher data rates to a wireless device. The specific number of soft channel bits a wireless device stores, however, may be the same for a wireless device of a particular category regardless of whether the wireless device is configured to receive 256QAM from the DL cell. A wireless device may store a smaller amount of received soft channel bits upon unsuccessful decoding of a transport block.

As a particular example, a radio network node may use a transport block size of 88896 to transmit data to a category four wireless device if the wireless device is configured to use 256QAM. The maximum number of received soft channel bits of this transport block size is 3*88896+12=266700. Upon unsuccessful decoding, the wireless device may store only 1827072/8=228384 soft channel bits according to this embodiment. In other words, a wireless device may support a larger transport block size for 256QAM compared to what is defined for other modulation schemes, but may still use the same "Total number of soft channel bits" as used with other modulation schemes. Thus, reusing existing UE categories is possible by changing the processing requirements for them. Such benefits may be realized by a wireless device with a faster processor (e.g., for processing larger transport block sizes in the same amount of time) but with the same amount of soft buffer memory (e.g., for storing the same amount of soft bits as previous devices). Such embodiments may be cost effective when soft buffer memory is relatively expensive compared to processor speed. Such behavior may be illustrated by modifying Table 4 as indicated, for example, by Table 6. According to particular embodiments described with respect to Table 6, a wireless device may store the maximum number of soft channel bits regardless of whether the wireless device is configured to receive 256QAM from the DL cell.

TABLE 6

Example of UE categories supporting 256QAM in DL

| UE Category | Maximum number of DL-SCH transport block bits received within a TTI (NOTE) | Maximum number of bits of a DL-SCH transport block received within a TTI | Total number of soft channel bits | Maximum number of supported layers for spatial multiplexing in DL |
|---|---|---|---|---|
| Category 1 | 10296 | 10296 | 250368 | 1 |
| Category 2 | 51024 | 51024 | 1237248 | 2 |

TABLE 6-continued

Example of UE categories supporting 256QAM in DL

| UE Category | Maximum number of DL-SCH transport block bits received within a TTI (NOTE) | Maximum number of bits of a DL-SCH transport block received within a TTI | Total number of soft channel bits | Maximum number of supported layers for spatial multiplexing in DL |
|---|---|---|---|---|
| Category 3 | 102048 | 75376 (64QAM) | 1237248 | 2 |
| Category 4 | 150752 (64QAM)<br>177792 (256QAM) | 75376 (64QAM)<br>88896 (256QAM) | 1827072 | 2 |
| Category 5 | 299552 (64QAM)<br>354912 (256QAM) | 149776 (64QAM)<br>177456 (256QAM) | 3667200 | 4 |
| Category 6 | 301504 (64QAM)<br>355584 (256QAM) | 149776 (4 layers, 64QAM)<br>177456 (4 layers, 256QAM)<br>75376 (2 layers, 64QAM)<br>88896 (2 layers, 256QAM) | 3654144 | 2 or 4 |
| Category 7 | 301504 (64QAM)<br>355584 (256QAM) | 149776 (4 layers, 64QAM)<br>177456 (4 layers, 256QAM)<br>75376 (2 layers, 64QAM)<br>88896 (2 layers, 256QAM) | 3654144 | 2 or 4 |
| Category 8 | 2998560 (64QAM)<br>3549360 (256QAM) | 299856 (64QAM)<br>354936 (256QAM) | 35982720 | 8 |

(NOTE): In carrier aggregation operation, the DL-SCH processing capability can be shared by the UE with that of MCH received from a serving cell. If the total eNB scheduling for DL-SCH and an MCH in one serving cell at a given TTI is larger than the defined processing capability, the prioritization between DL-SCH and MCH is left up to UE implementation.

To support increased transport block size on the transmitter side, an encoder may assume a large soft buffer in computing the circular buffer parameters. In particular embodiments, the method for determining soft buffer size described above with respect to 3GPP documentation may be modified as follows:

The circular buffer of length $K_w = 3K_\Pi$ for the r-th coded block may be generated as follows:

$$w_k = v_k^{(0)} \text{ for } k=0, \ldots, K_\Pi - 1$$

$$w_{K_\Pi + 2k} = v_k^{(1)} \text{ for } k=0, \ldots, K_\Pi - 1$$

$$w_{K_\Pi + 2k+1} = v_k^{(2)} \text{ for } k=0, \ldots, K_\Pi - 1$$

Denote the soft buffer size for the transport block by $N_{IR}$ bits and the soft buffer size for the r-th code block by $N_{cb}$ bits. The size $N_{cb}$ is obtained as follows, where C is the number of code blocks computed:

$$N_{cb} = \min\left(\left\lfloor \frac{N_{IR}}{C} \right\rfloor, K_w\right)$$

for DL-SCH and PCH transport channels,
$N_{Cb} = K_w$ for UL-SCH and MCH transport channels,
where $N_{IR}$ is equal to:

$$N_{IR} = \left\lfloor \frac{N_{soft}}{K_C \cdot K_{MIMO} \cdot \min(M_{DL\_HARQ}, M_{limit})} \right\rfloor$$

where:
If the wireless device is configured to support 256QAM for the DL cell,
  $N_{soft}$=2154240 if the wireless device is capable of supporting a maximum of two spatial layers for the DL cell,
  $N_{soft}$=4308480 if the wireless device is capable of supporting a maximum of four spatial layers for the DL cell,
  $N_{soft}$=42592320 if the wireless device is capable of supporting a maximum of eight spatial layers for the DL cell
Otherwise
If the wireless device signals ue-Category-v1020, and is configured with transmission mode 9 or transmission mode 10 for the DL cell, $N_{soft}$ may be the total number of soft channel bits according to the UE category indicated by ue-Category-v1020. Otherwise, $N_{soft}$ may be the total number of soft channel bits according to the UE category indicated by ue-Category (without suffix).
If $N_{soft}$=35982720 or 42592320,
  $K_C$=5,
  elseif $N_{soft}$=3654144 or 4308480 and the wireless device is capable of supporting no more than a maximum of two spatial layers for the DL cell,
  $K_C$=2
  else
  $K_C$=1
End if.

$K_{MIMO}$ may be equal to 2 if the wireless device is configured to receive PDSCH transmissions based on transmission modes 3, 4, 8, 9 or 10 as defined in 3GPP documentation, and may be equal to 1 otherwise.

$M_{DL\_HARQ}$ may be the maximum number of DL HARQ processes as defined in 3GPP documentation.

$M_{limit}$ may be a constant equal to 8.

One of skill in the art would understand that values given in the description and tables above are only examples and would recognize that the wireless device in the example embodiments has different processing requirements depending on whether the wireless device supports 256QAM. In some embodiments, 256QAM may or may not operate with all UE categories. For example, Table 6 includes example rows where 256QAM is not supported by a particular category of wireless device.

In some embodiments, support for 256QAM and new processing capabilities, such as those indicated in Table 6, may be signaled by the network by a wireless device capability bit. In some embodiments, a wireless device of certain release level and category may be required to support 256QAM.

In some embodiments, a wireless device indicating support for 256QAM may be able to process larger received transport blocks. If the use of 256QAM, however, is controlled by which transmission mode the wireless device is configured to use or some other specific configuration parameter, then the higher processing capabilities are not used until the use of 256QAM is configured for the wireless device. Furthermore, even if a wireless device is configured to use 256QAM, the wireless device may not be scheduled with 256QAM. A radio network node may select with which modulation order to schedule the wireless device based on selecting an appropriate MCS determined by radio conditions. In particular embodiments, signaling of support for 256QAM means that the wireless device may be scheduled with modulation order 256QAM.

In particular embodiments, when a radio network node configures a wireless device with 256QAM, the radio network node may then schedule the wireless device with the larger transport block sizes corresponding to 256QAM but not affect the "Total number of soft channel bits" (i.e., $N_{soft}$) assumed when encoding transport block(s) for the wireless device.

In particular embodiments, when a wireless device is decoding a transport block modulated with 256QAM, the wireless device may assume no difference in the parameter "Total number of soft channel bits" (i.e., $N_{soft}$) compared to when 256QAM is not configured. Storing of soft channel bits in the wireless device may not be affected by whether the wireless device is configured to use 256QAM.

In a traditional wireless device, if the use of 256QAM required a different amount of "Total number of soft channel bits" (i.e., $N_{soft}$) than when 256QAM is not used, then the wireless device would reset its HARQ processes when the wireless device is configured to use or not use 256QAM. In the disclosed embodiments, wherein only the processing requirements of the wireless device change with the configuration of 256QAM, the HARQ processes do not need to reset because the "Total number of soft channel bits" (i.e. $N_{soft}$) remains the same independent from whether 256QAM is configured. In particular embodiments, a wireless device does not reset its HARQ processes based on whether 256QAM is configured.

In some embodiments, if a radio network node configures a wireless device from using some other modulation scheme to use 256QAM, the HARQ processes may still be scheduled by the radio network node and correspondingly the radio network node may continue to schedule HARQ processes that it scheduled before the configuration. In particular embodiments, the radio network node may indicate a transport block is a re-transmission by not toggling the NDI (New Data Indicator) flag for at least one of the ongoing HARQ processes in the DCI message assigning the DL resource.

In some embodiments, if a radio network node configures a wireless device from using 256QAM to use another modulation scheme, then the HARQ processes that are not associated with a large transport block size (e.g., larger than supported by current LTE) may still be scheduled by the wireless device and correspondingly the radio network node can continue to schedule these HARQ processes it scheduled before the configuration. In particular embodiments, the radio network node may indicate a transport block is a re-transmission by not toggling the NDI flag for at least one of the ongoing HARQ processes the DCI message assigning the DL resource.

FIG. 10 is a flowchart of an example method of transmitting a transport block, according to some embodiments. In particular embodiments, one or more steps of method 1000 may be performed by components of network 100 described with reference to FIGS. 1-9.

The method begins at step 1010, where a network node determines a first modulation scheme for a first transmission. For example, radio network node 120 may determine wireless device 110 is operating under favorable radio conditions and that wireless device 110 supports 256QAM. Wireless device 110 may be a category eight wireless device. Radio network node 120 may determine to modulate the first transmission with 256QAM. Based on the particular combination of modulation scheme and category type and using example Table 6, radio network node 120 may determine that "Maximum number of DL-SCH transport block bits received within a TTI" is 3549360 and "Maximum number of bits of a DL-SCH transport block received within a TTI" is 354936.

At step 1012, the network node may determine a number of soft channel bits based on a second modulation scheme. For example, radio network node 120 may determine that wireless device 110, although it supports 256QAM, is able to only store a number of soft channel bits associated with 64QAM. In other words, wireless device 110 may be capable of supporting both 256QAM and 64QAM, but uses the same size soft buffer for both. Based on example Table 6, radio network node 120 may determine that "Total number of soft channel bits" is 359827720.

At step 1014, based on the sizes and number of soft channel bits described above, the network node encodes the transport block according to the first modulation coding scheme. For example, radio network node 120 encodes transport block 150 using 256QAM and the sizes and number of soft channel bits determined by example Table 6 described above.

At step 1016, the network node transmits the transport block to the wireless device. In particular embodiments, selection of particular bits to re-transmit may be based on a circular buffer of a size corresponding to the number of soft channel bits determined above. For example, radio network node 120 may transmit transport block 150 to wireless device 110.

Modifications, additions, or omissions may be made to method 1000. Additionally, one or more steps in method 1000 of FIG. 10 may be performed in parallel or in any suitable order. In some embodiments, a wireless device may use the same steps to transmit a transport block to a radio network node.

FIG. 11 is a flowchart of an example method of receiving a transport block, according to some embodiments. In particular embodiments, one or more steps of method 1100 may be performed by components of network 100 described with reference to FIGS. 1-9.

The method begins at step 1110, where a wireless device receives a transport block modulated according to a first modulation coding scheme. The total number of bits in the transport block may be based on the first modulation coding scheme.

At step 1111, the wireless device determines a number of soft channel bits in the transport block. In particular embodiments, the number of soft channel bits in the transport block may be based on a second modulation coding scheme. For example, wireless device 110 may be a category eight wireless device and wireless device 110 may receive transport block 150 from radio network node 120 modulated with 256QAM. The length of transport block 150 may be based on a category eight wireless device and 256QAM. The number of soft channel bits may be based on 64QAM.

At step 1112, the wireless device stores the soft channel bits in its soft buffer. The number of soft channel bits stored is based on the second modulation scheme and the category type of the wireless device. For example, wireless device 110, a category eight device, may store a number of soft channel bits in its soft buffer based on 64QAM.

At step 1114, the wireless device determines if an error was detected decoding a previous transmission block. For example, wireless device 110 may check whether the NDI is toggled indicating whether transport block 150 is a new transport block 150 or a re-transmission.

If no previous error was detected, the wireless device continues to step 1116 where it decodes the transport block. If a previous error was detected, the wireless device continues to step 1118 where it combines the bits in the received transport block with the bits in the soft buffer. In particular embodiments, the previous transport block may have been encoded according to a different modulation scheme. For example, current transport block 150 may be encoded with 256QAM. A previous transport block 150 may have been encoded with 64QAM. If the number of soft channel bits stored for current transport block 150 and previous transport block 150 are the same, the transport blocks 150 may be combined. At step 1116, the wireless device decodes the combined transport block from step 1118.

Modifications, additions, or omissions may be made to method 1100. Additionally, one or more steps in method 1100 of FIG. 11 may be performed in parallel or in any suitable order. In some embodiments, a radio network node may use the same steps to receive a transport block from a wireless device.

FIG. 12 is a flowchart of an example method of performing a hybrid automatic repeat request process. In particular embodiments, one or more steps of method 1200 may be performed by components of network 100 described with reference to FIGS. 1-9.

At step 1210, a wireless device receives a first transport block encoded with a first modulation scheme. For example, wireless device 110, a category eight wireless device, may receive a first transport block 150 encoded according to 256QAM.

At step 1212, the wireless device decodes the first transport block using a number of soft channel bits N. For example, wireless device 110 may store N soft channel bits in its soft buffer, where N is determined from example Table 6 for a category eight wireless device using 256QAM.

At step 1214, the wireless device may receive a second transport block encoded with a second modulation scheme. For example, wireless device 110 may receive a second transport block 150 encoded according to 64QAM.

At step 1216, the wireless device decodes the second transport block using the number of soft channel bits N. For example, wireless device 110 may store N soft channel bits in its soft buffer, where N is the same as in step 1212 and may be determined from example Table 6 for a category eight wireless device using 64QAM.

In particular embodiments, a HARQ process may perform error correction by combining soft channel bits from the first transport block 150 with soft channel bits from the second transport block 150. In particular embodiments, the HARQ process does not reset when the modulation scheme changes.

Modifications, additions, or omissions may be made to method 1200. Additionally, one or more steps in method 1200 of FIG. 12 may be performed in parallel or in any suitable order. In some embodiments, a radio network node, such as radio network node 120, may use the same steps to perform a HARQ process.

FIG. 13 is a block diagram illustrating an example embodiment of a wireless device. The wireless device is an example of wireless device 110 illustrated in FIG. 9. Particular examples include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, or any other device that can provide wireless communication. The wireless device includes transceiver 1310, processor 1320, and memory 1330. In some embodiments, transceiver 1310 facilitates transmitting wireless signals to and receiving wireless signals from wireless radio network node 120 (e.g., via an antenna), processor 1320 executes instructions to provide some or all of the functionality described herein as provided by the wireless device, and memory 1330 stores the instructions executed by processor 1320.

Processor 1320 includes any suitable combination of hardware and software implemented in one or more integrated circuits or modules to execute instructions and manipulate data to perform some or all of the described functions of the wireless device. In some embodiments, processor 1320 may include, for example, one or more computers, one more programmable logic devices, one or more central processing units (CPUs), one or more microprocessors, one or more applications, and/or other logic, and/or any suitable combination of the preceding. Processor 1320 may include analog and/or digital circuitry configured to perform some or all of the described functions of wireless device 110. For example, processor 1320 may include resistors, capacitors, inductors, transistors, diodes, and/or any other suitable circuit components.

Memory 1330 is generally operable to store computer executable code and data. Examples of memory 1330 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

In particular embodiments, processor 1320 in communication with transceiver 1310 receives transport blocks from radio network node 120. Processor 1320 may perform demodulation and error correction on the received transport blocks. Other embodiments of the wireless device may include additional components (beyond those shown in FIG. 13) responsible for providing certain aspects of the wireless device's functionality, including any of the functionality described above and/or any additional functionality (including any functionality necessary to support the solution described above).

In particular embodiments, wireless device 110 may include an encoding/decoding module, a HARQ module, and a communication module. The encoding/decoding module may perform the processing functions of wireless device 110 related to encoding or decoding a transport block according to a particular modulation coding scheme. For example, the encoding/decoding module may encode a transmission block using QPSK, 16QAM, 64QAM, 256QAM or any other suitable MCS. The encoding/decoding module may also decode such a transmission block. In certain embodiments, the encoding/decoding module may include or be included in processor 1320. The encoding/decoding module may include analog and/or digital circuitry configured to perform any of the functions of the encoding/decoding module and/or processor 1320.

The HARQ module may perform the processing functions of wireless device 110 related to error detection and correction for decoding a transport block. For example, the HARQ module may send ACK/NACK indicating whether decoding of transport block is successful. As another example, the HARQ module may combine redundancy versions of the same transport block for error correction. In certain embodiments, the HARQ module may include or be included in processor 1320. The encoding/decoding module may include analog and/or digital circuitry configured to perform any of the functions of the HARQ module and/or processor 1320.

The communication module may perform the transmit and receive functions of wireless device 110. For example, the communication module may receive a transmission block from radio network node 120. As another example, the communication module may receive or transmit configuration messages to radio network node 120 of network 100. The configuration messages may indicate support for 256QAM capabilities. In certain embodiments, the communication module may include or be included in transceiver 1310. The communication module may include a transmitter and/or a transceiver. In certain embodiments, the communication module may include or be included in processor 1320. The communication module may include circuitry configured to wirelessly transmit messages and/or signals. In particular embodiments, the communication module may receive messages and/or signals for transmission to/from the encoding/decoding module or to/from the HARQ module.

FIG. 14 is a block diagram illustrating an example embodiment of a radio network node. Radio network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. Radio network node 120 includes at least one transceiver 1410, at least one processor 1420, at least one memory 1430, and at least one network interface 1440. Transceiver 1410 facilitates transmitting wireless signals to and receiving wireless signals from a wireless device, such as wireless devices 110 (e.g., via an antenna); processor 1420 executes instructions to provide some or all of the functionality described above as being provided by a radio network node 120; memory 1430 stores the instructions executed by processor 1420; and network interface 1440 communicates signals to backend network components, such as a gateway, switch, router, Internet, Public Switched Telephone Network (PSTN), controller, and/or other network nodes 120. Processor 1420 and memory 1430 can be of the same types as described with respect to processor 1320 and memory 1330 of FIG. 13 above.

In some embodiments, network interface 1440 is communicatively coupled to processor 1420 and refers to any suitable device operable to receive input for radio network node 120, send output from radio network node 120, perform suitable processing of the input or output or both, communicate to other devices, or any combination of the preceding. Network interface 1440 includes appropriate hardware (e.g., port, modem, network interface card, etc.) and software, including protocol conversion and data processing capabilities, to communicate through a network.

In particular embodiments, processor 1420 in communication with transceiver 1410 transmits transport blocks to wireless device 110. The transport blocks may be modulated according to a particular MCS. In particular embodiments, processor 1420 in communication with transceiver 1410 transmits transport blocks, as described above, to wireless device 110.

Other embodiments of radio network node 120 include additional components (beyond those shown in FIG. 14) responsible for providing certain aspects of the network node's functionality, including any of the functionality described above and/or any additional functionality (including any functionality necessary to support the solution described above). The various different types of radio network nodes may include components having the same physical hardware but configured (e.g., via programming) to support different radio access technologies, or may represent partly or entirely different physical components.

In particular embodiments, radio network node 120 may include an encoding/decoding module, a HARQ module, and a communication module. The encoding/decoding module may perform the processing functions of radio network node 120 related to encoding or decoding a transport block according to a particular modulation coding scheme. For example, the encoding/decoding module may encode a transmission block using QPSK, 16QAM, 64QAM, 256QAM or any other suitable MCS. The encoding/decoding module may also decode such a transmission block. In certain embodiments, the encoding/decoding module may include or be included in processor 1420. The encoding/decoding module may include analog and/or digital circuitry configured to perform any of the functions of the encoding/decoding module and/or processor 1420.

The HARQ module may perform the processing functions of radio network node 120 related to error detection and correction for decoding a transport block. For example, the HARQ module may receive ACK/NACK indicating whether decoding of transport block is successful. As another example, the HARQ module may transmit redundancy versions of the same transport block for error correction. In certain embodiments, the HARQ module may include or be included in processor 1420. The encoding/decoding module may include analog and/or digital circuitry configured to perform any of the functions of the HARQ module and/or processor 1420.

The communication module may perform the transmit and receive functions of radio network node 120. For example, the communication module may receive a transmission block from wireless device 110. As another example, the communication module may receive or transmit configuration messages to wireless device 110 of network 100. The configuration messages may indicate support for 256QAM capabilities. In certain embodiments, the communication module may include or be included in transceiver 1410. The communication module may include a transmitter and/or a transceiver. In certain embodiments, the communication module may include or be included in processor 1420. The communication module may include circuitry configured to wirelessly transmit messages and/or signals. In particular embodiments, the communication module may receive messages and/or signals for transmission to/from the encoding/decoding module or to/from the HARQ module.

Some embodiments of the disclosure may provide one or more technical advantages. As an example, in some embodiments, the methods and apparatus disclosed herein may facilitate development of low cost UE implementations with support for 256QAM capabilities and faster time to market for 256QAM support in LTE. In particular embodiments, link performance may be used more efficiently to improve overall system performance.

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

The invention claimed is:

1. A method of performing a Hybrid Automatic Repeat Request (HARQ) process, the method comprising:
   receiving, by a wireless device executing a HARQ process, a first transport block encoded according to a category type of the wireless device and a first modulation coding scheme;
   decoding, by the HARQ process, the first transport block using a number of soft bits N;
   receiving, by the wireless device, a second transport block encoded according to the category type and a second modulation coding scheme different from the first modulation coding scheme; and
   decoding, by the HARQ process, the second transport block using the number of soft bits N.

2. The method of claim 1, wherein the second modulation scheme is a 256 Quadrature Amplitude Modulation (256QAM) scheme and the first modulation scheme is a modulation scheme that uses fewer bits per symbol than the second modulation scheme.

3. The method of claim 2, wherein the first modulation scheme is a 64 Quadrature Amplitude Modulation (64QAM) modulation scheme.

4. The method of claim 1, wherein the first modulation scheme is a 256QAM scheme and the second modulation scheme is a modulation scheme that uses fewer bits per symbol than the first modulation scheme.

5. The method of claim 4, wherein the second modulation scheme is a 64QAM modulation scheme.

6. The method of claim 1, wherein an operational state of the HARQ process is not reset after determining the second modulation scheme is different than the first modulation scheme and before decoding the second transmission block.

7. The method of claim 1, wherein a New Data Indicator (NDI) corresponding to the second transport block indicates that the second transport block is a re-transmission.

8. A wireless device for performing a Hybrid Automatic Repeat Request (HARQ) process, the wireless device comprising a processor operable to:
   receive a first transport block encoded according to a category type of the wireless device and a first modulation coding scheme;
   decode the first transport block using a number of soft bits N;
   receive a second transport block encoded according to the category type and a second modulation coding scheme different from the first modulation coding scheme; and
   decode the second transport block using the number of soft bits N.

9. The wireless device of claim 8, wherein the second modulation scheme is a 256 Quadrature Amplitude Modulation (256QAM) scheme and the first modulation scheme is a modulation scheme that uses fewer bits per symbol than the second modulation scheme.

10. The wireless device of claim 9, wherein the first modulation scheme is a 64 Quadrature Amplitude Modulation (64QAM) modulation scheme.

11. The wireless device of claim 8, wherein the first modulation scheme is a 256QAM scheme and the second modulation scheme is a modulation scheme that uses fewer bits per symbol than the first modulation scheme.

12. The wireless device of claim 11, wherein the second modulation scheme is a 64QAM modulation scheme.

13. The wireless device of claim 8, wherein an operational state of the HARQ process is not reset after determining the second modulation scheme is different than the first modulation scheme and before decoding the second transmission block.

14. The wireless device of claim 8, wherein a New Data Indicator (NDI) corresponding to the second transport block indicates that the second transport block is a re-transmission.

15. A non-transitory computer-readable storage medium having computer-readable program code embodied therewith for performing a Hybrid Automatic Repeat Request (HARQ) process, the computer-readable program code comprising computer-readable program code configured to:
   receive a first transport block encoded according to a category type of the wireless device and a first modulation coding scheme;
   decode the first transport block using a number of soft bits N;
   receive a second transport block encoded according to the category type and a second modulation coding scheme different from the first modulation coding scheme; and
   decode the second transport block using the number of soft bits N.

16. The computer-readable storage medium of claim 15, wherein the second modulation scheme is a 256 Quadrature Amplitude Modulation (256QAM) scheme and the first modulation scheme is a modulation scheme that uses fewer bits per symbol than the second modulation scheme.

17. The computer-readable storage medium of claim 16, wherein the first modulation scheme is a 64 Quadrature Amplitude Modulation (64QAM) modulation scheme.

18. The computer-readable storage medium of claim 15, wherein the first modulation scheme is a 256QAM scheme and the second modulation scheme is a modulation scheme that uses fewer bits per symbol than the first modulation scheme.

19. The computer-readable storage medium of claim 18, wherein the second modulation scheme is a 64QAM modulation scheme.

20. The computer-readable storage medium of claim 15, wherein an operational state of the HARQ process is not reset after determining the second modulation scheme is different than the first modulation scheme and before decoding the second transmission block.

* * * * *

UNITED STATES PATENT AND TRADEMARK OFFICE
CERTIFICATE OF CORRECTION

PATENT NO. : 9,801,185 B2  
APPLICATION NO. : 15/030496  
DATED : October 24, 2017  
INVENTOR(S) : Larsson et al.

Page 1 of 1

It is certified that error appears in the above-identified patent and that said Letters Patent is hereby corrected as shown below:

On the Title Page

On Page 2, in Item (56), under "OTHER PUBLICATIONS", in Column 2, Line 7, delete "Sevilla," and insert -- Seville, --, therefor.

In the Specification

In Column 1, Line 8, delete "PCT/162015/050629," and insert -- PCT/IB2015/050629, --, therefor.

In Column 5, Line 47, delete "$K_C=$" and insert -- $K_C=5$, --, therefor.

Signed and Sealed this  
Twenty-fourth Day of December, 2019

Andrei Iancu  
*Director of the United States Patent and Trademark Office*